United States Patent Office 3,504,040
Patented Mar. 31, 1970

3,504,040
2,4,6-TRIS(LOWER ALKOXYMETHYL) RESORCINOLS
Alfred J. Kolka, Pittsburgh,, Wun T. Tai, Monroeville, and Roy H. Moult, Murrysville, Pa., assignors to Koppers Company, Inc., a corporation of Delaware
No Drawing. Continuation-in-part of application Ser. No. 565,380, July 15, 1966. This application Feb. 7, 1969, Ser. No. 797,656
Int. Cl. C07c *39/08*
U.S. Cl. 260—611          2 Claims

ABSTRACT OF THE DISCLOSURE

Novel tris-substituted resorcinol compounds such as tris(methoxymethyl) resorcinol are described that act as curing agents and provide reinforcement for rubber compositions and increase the adhesion of fabrics to such rubber compositions.

CROSS-REFERENCE TO RELATED APPLICATION

This application is a continuation-in-part of our copending application Ser. No. 565,380 filed July 15, 1966.

BACKGROUND OF THE INVENTION

Curing agents are available for the crosslinking of resinous substances. Some such curing agents are useful in rubber compositions. C. Danielson, in U.S. Patent 3,018,207 discloses that resorcinol or resorcinol resins when cured by means of methyleneaminoacetonitrile provided enhanced adhesion of a textile cord to the resulting rubber stock. Problems arise when such an amino compound is employed because of the toxicity of these amino compounds.

We have discovered certain novel tris-substituted resorcinol compounds which, when added to rubber compositions containing resorcinol, a resorcinol resin or other polymerizable reinforcing additive, greatly increase the adhesion of the resulting rubber stocks to textile tire cords. In addition to the improved adhesion, the resulting rubber compositions have a lower modulus value than unmodified rubber. Since the modulus value is a measure of stiffness or lack of flexibility of rubber compounds, a decrease in modulus value provides for longer life of textile tire cords. R. Patterson and R. Anderson recognize in their article, "Fatigue Failure in Nylon Reinforced Tires," Rubber Chemistry and Technology, vol. 38, No. 4, November 1965, that the stiffness of the region surrounding a cord influences significantly the fatiguing rate of the cord. In addition, the precent of elongation of these compositions is increased by the use of our tris-substituted resorcinol derivatives as curing agents.

SUMMARY OF THE INVENTION

The novel curing agents of our invention are the tristubstituted resorcinol compounds characterized by the formula:

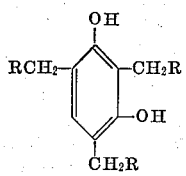

wherein R is lower alkoxy.

DETAILED DESCRIPTION

The compounds of our invention are novel compounds and are prepared from resorcinol, paraformaldehyde and morpholine as starting materials. These compounds are readily prepared by a process which is schematically illustrated by the following:

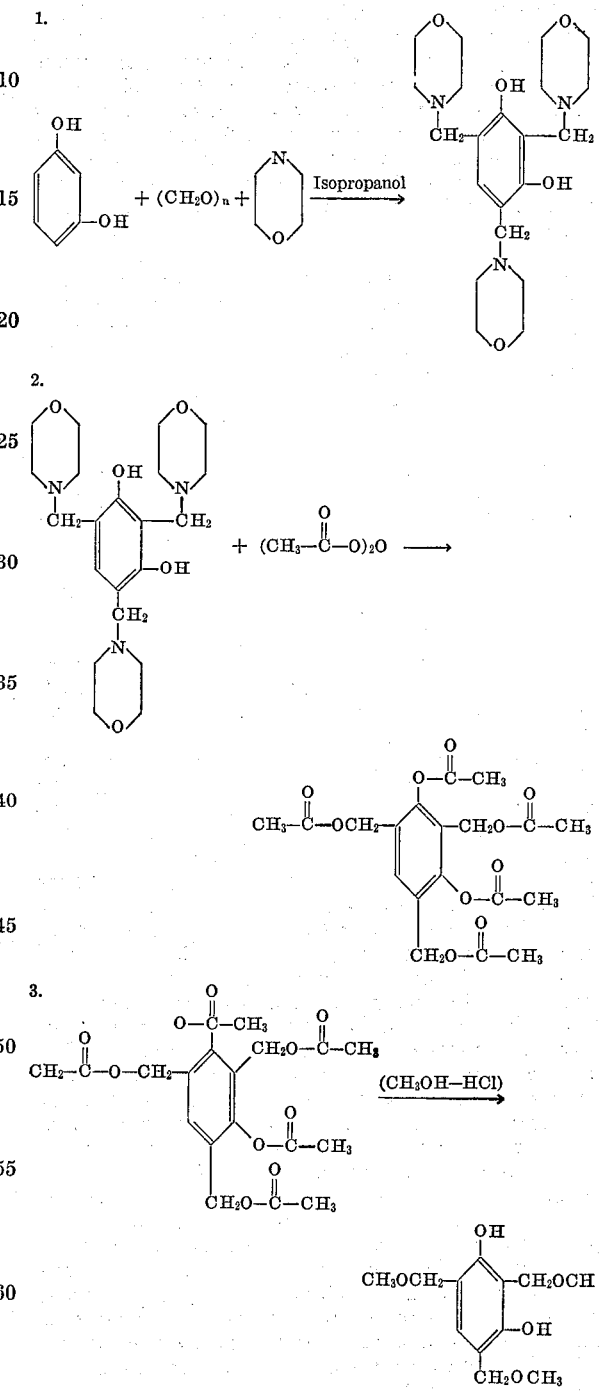

The general preparation of these compounds involves the reaction of one mole or resorcinol and three moles each of paraformaldehyde and morpholine in isopropanol at reflux temperature to produce tris(morpholinomethyl) resorcinol, the time of the reaction being about one and one-half hours. Utilizing the tris(morpholinomethyl) resorcinol as starting material, tris(acetoxymethyl) resorcinol diacetate can be produced by refluxing with excess acetic anhydride with exclusion of moisture. Alcoholysis of the tris-(acetoxymethyl) resorcinol diacetate is then employed to produce tris(alkoxymethyl) resorcinol.

The novel tris(alkoxymethyl) resorcinol compounds, such as 2,4,6-tris(methoxymethyl) resorcinol are useful as curing agents for a variety of purposes. Such uses include the curing of resorcinol, phenol, melamine and urea resins and polyvinyl alcohol solutions for application in molding, laminating, bonding and surface coatings. Polymer systems such as polystyrene and nylon systems can be cured with improvement in heat distortion temperature and solvent resistance characteristics. Also, addition to starch adhesives, to improve water resistance thereof, or animal glues, to impart wet strength and upgrade dry strength, is useful. In addition, the tris(alkoxymethyl) resorcinol compounds can be used as chemical intermediates to prepare branched antioxidant or branched resinous compounds.

These compounds have also been found to have a beneficial effect upon reinforced rubber compositions. When employed in resorcinol or resorcinol resin modified rubber compositions, these compounds act as a curing agent and cause the formation of unusual and exceptional physical properties in the resultant composition.

The rubber component to which the reinforcing additive and any of the curing agents of our invention are added may be any of the various types of rubber substrates including natural rubber and synthetic rubbers such as styrene-butadiene rubbers, polybutadiene rubber, butyl-ethylene-propylene terpolymers and the synthetic natural polyisoprene rubbers. Reclaims of the above-mentioned rubber compositions are also used.

In addition, to resorcinol, and resorcinol-aldehyde resins as the polymerizable reinforcing addition, other meta-disubstituted benzene compounds containing hydroxyl or amino radicals may be used, as may be polyhydroxydiphenyls, polyhydroxynaphthalenes such as 1,5-naphthalendiol, and suitable polymerizable alkylated phenols, as for example 3,5-xylenol.

In producing the improved rubber compositions of our invention, the resorcinol resin or other reinforcing agent is intimately mixed with the rubber hydrocarbon constituents in an intensive mixer such as a Banbury mixer, or by means of milling rolls or the like. Although, the tris-substituted resorcinol compounds, such as 2,4,6-tris (methoxymethyl) resorcinol, may be mixed in at this stage of the processing, better results are generally obtained when these derivatives are added during the final mixing with the normal curing agents (sulfur and accelerators) on the milling rolls, and at lower temperatures. Mixing for longer times or at higher temperatures is not generally advantageous or deleterious to the product. The fact that these curing agents can be added at higher temperatures results in easier processing of the modified rubber compositions and is advantageous over other curing agents which tend to pre-cure and results in scorching.

The preferred amount of resorcincol, resorcinol-formaldehyde resin, or other polymerizable reinforcing additive added to the rubber stock is in the order of two parts by weight for each one hundred parts of the hydrocarbon type rubber components (i.e. the total of the raw material rubber and synthetic rubber) in the rubber composition. The use of twice as much or one-half as much of the polymerizable reinforcing additive also has a beneficial effect upon the rubber composition, but the properties are less than optimum.

The tris(methoxymethyl) resorcinol is added in amounts of about 10 parts per hundred parts of resorcinol, resorcinol resin or other polymerizable reinforcing additive. An increase of the amount to about 50 parts per one hundred parts of resorcinol or other resin did not result in any substantial improvements in the properties of the resulting compositions.

The modified rubber compositions of our invention show enhanced adhesion and physical property modification with textile tire cords such as rayon or other synthetic fibers such as nylon and polyester fibers. Enhanced adhesion is also provided with other tire cords such as glass fiber or metal cords.

The H-test has been employed by the rubber industry to determine the static adhesion of textile tire cords to rubber. This test is specified as ASTM D–2138–62–T and was employed in testing the adhesion of the rubber compositions of this invention. The higher the H-test value, the stronger the adhesion of the rubber coating to the cord.

In the physical testing of the rubber compositions of our invention, the material was sheeted out at 45 mils thickness and was molded in standard ASTM slabs according to Method ASTM D–15.

These slabs were cured at 293° F. for periods of 30 and 45 minutes. The tensile strength, modulus at 300% stretch, elongation at break, and set at break were determined according to ASTM D–412–62T. The hardness of the compositions was determined using a Shore-A testing meter, according to ASTM D–676–59–T.

Our invention is further illustrated by the following examples wherein unless otherwise noted, parts are parts by weight.

EXAMPLE I

The 2,4,6-tris(morpholinomethyl) resorcinol was made by forming a mixture of three moles of paraformaldehyde (9 parts), three moles of morpholine (26 parts) and 16 parts of isopropanol (as solvent). The mixture was heated in a steam bath until a homogeneous solution resulted. Thereafter, one mole of resorcinol (11 parts) in 40 parts of isopropanol (as solvent) was added and the resultant solution refluxed in a steam bath for 1.5 hours. The hot solution was then concentrated on a rotary evaporator at about 60°/15 mm. and finally at about 60°/2 mm. The glassy residue was washed with ether to give a white solid (M.P. 132–135°).

EXAMPLE II

Crude 2,4,6-tris(morpholinomethyl) resorcinol M.P. 132–135° (Example I) 8.14 g., 20.0 moles was added to 20 ml. of acetic anhydride and heated with exclusion of atmospheric moisture and with occasional shaking in a steam bath for 15 hours. The solution was concentrated on a rotary evaporator at about 80°/10 mm. At the end of the concentration, acetic acid odor was no longer detectable. The residue, 13.0 g. was taken up in 100 ml. of ethyl ether and washed with brine (3×30 ml.) and dried over magnesium sulfate. Evaporation of ether yielded 8.15 g. of yellow oil. The oil was dissolved in approximately 20 ml. of absolute ethanol and crude 2,4,6-tris (acetoxymethyl) resorcinol diacetate, M.P. 68–70° C. was precipitated by addition of approximately 200 ml. of petroleum ether (B.P. 40–60°). The weight of the crude product was 5.9 g. pale yellow crystalline solid corresponding to a 72% yield. An analytical sample M.P. 72–73.5° C. was prepared by recrystallization of the crude product from charcoal-absolute ethanol, followed by methanol. The infra-red spectrum of the crude product was identical to that of the analytical sample.

Analysis of the product by infra-red and nuclear magnetic resonance (acetone-$d_6$) gave results consistent with the structure of 2,4,6-tris(acetoxymethyl) resorcinol diacetate. Elemental analysis results were: Calc'd as $C_{10}H_{22}O_{10}$ (molecule wt. 410.0) (percent): C, 55.60; H, 5.40. Found (percent): C, 55.81; H, 5.59.

EXAMPLE III 2,4,6-tris(acetoxymethyl) resorcinol diacetate (prepared as in Example II), M.P. 68–70°, 410 mg., 1.00 mole, was added to 50 ml. of methanol. Concentrated HCl, 3 drops, was added and the solution refluxed in a steam bath under $N_2$ for 3 hours. The solution was saturated with solid sodium bicarbonate and allowed to stand until the solution was very slightly yellow. The solution was filtered and the filtrate concentrated on a rotary evaporator at −10° to −5°/water aspirator vacuum. The residue, a pink solid, 620 mg. was agitated with 10 ml. of benzene. Petroleum ether (B.P. 30°–60°), 40 ml., was added and the mixture filtered. The filtrate was concentrated on a rotary evaporator at −10° to room temperature and at 4 to 15 mm. The residue, colorless needles, M.P. 51–52.5°, 2,4,6-tris(methoxymethyl) resorcinol, weighed 170 mg. (yield 70.3%). Recrystallization twice from petroleum ether (B.P. 30–60°) raised the M.P. to 53–53.5°.

The product was analyzed by intra-red and by nuclear magnetic resonance (CDCl$_3$) and the results were consistent with the structure of 2,4,6-tris(methoxymethyl) resorcinol. Elemental analysis results were: Calculated at $C_{12}H_{18}O_5$ (percent): C, 59.48; H, 7.49. Values found (percent): C, 59.38; H, 7.60. Molecular weight analysis by vapor phase osmometry (in benzene) gave a value of 250 corresponding to the calculated value of 242.3.

In a subsequent run, a 10-fold scaled-up reaction was run. The diacetate solution was refluxed for 3 hours and subsequent concentrations of the reaction performed at 18–35°/water aspirator vacuum. The yield was comparable to the smaller run.

EXAMPLE IV

A rubber composition was formed containing the following ingredients:

| | Parts (by weight) |
|---|---|
| Styrene-butadiene rubber, Synpol 1551 (an oil extended type) | 60 |
| Smoked Sheet No. IRSS (standard quality natural rubber) | 60 |
| Reclaim rubber (whole tire, first quality) | 36 |
| Carbon black, Continex SRF/HM | 48 |
| Octamine (Naugatuck) | 1.2 |
| Zinc oxide | 6 |
| Stearic acid | 1.8 |
| Pine tar (Tarene No. 40) | 4.8 |
| Light process oil (Sunoco Circo Light) | 4.8 |

The above ingredients were mixed for 10 minutes in a Banbury mixer, the temperature rising to about 320° F. during this period. The following ingredients were added when the master batch rubber was being milled on Farrell-Birmingham rolls at a temperature of 180° F.

| | Parts (by weight) |
|---|---|
| Sulfur (Rubbermaker's) | 4.5 |
| Delac S prills (Naugatuck) | 1.32 |

This composition was designated as "Control."

EXAMPLE V

A composition was formed corresponding to the composition, prior to mixing, of Example IV. To this composition there was added 2.4 parts by weight of a conventional resorcinol-formaldehyde resin prepared generally according to the procedure described by P. H. Rhodes, in U.S. 2,385,372. The composition was mixed as in Example IV, except that during the mixing, 0.24 part by weight of 2,4,6-tris(methoxymethyl) resorcinol (Example III) was added. This composition was designated Composition A.

EXAMPLE VI

A composition was prepared using the ingredients and processing of Composition A (Example V), except that trimeric methyleneaminoacetonitrile (U.S. 3,018,207) was used in place of tris(methoxymethyl) resorcinol. This composition was designated Composition B.

EXAMPLE VII

The compositions of Examples IV, V, and VI were sheeted out at 45 mils thickness for physical tests and for adhesion evaluations. Comparison of the physical properties of the two modified rubber compositions and the control were made. Tensile strengths, modulus at 300% stretch, elongation at break, and set at break were determined according to ASTM D–412–62–T. Hardness was determined using a Shore-A testing meter, according to ASTM D–676–59–T. The results were:

| Physical properties cured at 293° F. | Control | Composition A | Composition B |
|---|---|---|---|
| Tensile strength, p.s.i.: | | | |
| 30 min | 2,126 | 2,200 | 2,051 |
| 45 min | 2,150 | 2,200 | 1,974 |
| 300% modulus, p.s.i.: | | | |
| 30 min | 860 | 600 | 1,077 |
| 45 min | 1,100 | 900 | 1,195 |
| Elongation, percent: | | | |
| 30 min | 426 | 605 | 475 |
| 45 min | 480 | 628 | 435 |
| Set at break: | | | |
| 30 min | 22 | 25 | 21 |
| 45 min | 21 | 27 | 19 |
| Shore A hardness: | | | |
| 30 min | 59 | 50 | 63 |
| 45 min | 57 | 54 | 63 |

As can be seen, the Composition A, containing tris(methoxymethyl) resorcinol, exhibited improved properties including a decreased modulus value.

EXAMPLE VIII

The rubber compositions of Examples IV, V and VI were also compared with respect to static adhesion according to ASTM D–2138–62T. Tire cord, Du Pont nylon type 714 of 840 denier, 2-ply, with 12/12 twist, was treated with a standard laboratory latex dip of the following formula:

| | Weight, grams |
|---|---|
| Resorcinol - formaldehyde resins (75% solids, aqueous solution) | 26.7 |
| Water | 407.7 |
| Formaldehyde, methanol free (37%) | 20.3 |
| Aqueous NaOH solution (10%) | 8.0 |
| Vinylpyridine latex (42% solid) (Gen-Tac) | 250.0 |

The nylon cord was treated with low tension through the dip (40–80 grams), then dried at 430° F. at 119 feet per minute, an exposure time of 19.8 seconds.

Samples of this cord were vulcanized at 293° F. for 45 minutes to provide ¼" H-test specimens. The results of static adhesion tests were:

H-test (212° F.):
| | |
|---|---|
| Control | 18.3 |
| Composition A | 20.8 |
| Composition B | 20.8 |

As can be seen from the above data, the resorcinol resin modified rubber composition cured with tris(methoxymethyl)resorcinol exhibited good static adhesion.

EXAMPLE IX

A rubber composition was formed according to Example V, except that resorcinol was used in place of the resorcinol-formaldehyde resin. Testing of the physical properties as in Example VI and adhesive properties as in Example VIII showed the composition to have properties comparable to those of Composition A.

What is claimed is:
1. The compound of the formula:
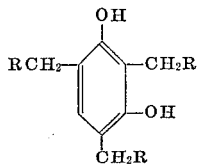
wherein R is lower alkoxy.
2. 2,4,6-tris(methoxymethyl) resorcinol.
References Cited
UNITED STATES PATENTS
3,367,976  2/1968  Larkin _____ 260—611
JAMES A. PATTEN, Primary Examiner
U.S. Cl. X.R.
106—218, 287; 117—126, 128.7, 138.8, 144, 146; 156—326; 260—47, 53, 54, 78, 88.3, 91.3, 93.5, 247.5, 479, 709